(12) United States Patent
Breitzman et al.

(10) Patent No.: US 6,175,824 B1
(45) Date of Patent: Jan. 16, 2001

(54) METHOD AND APPARATUS FOR CHOOSING A STOCK PORTFOLIO, BASED ON PATENT INDICATORS

(75) Inventors: Anthony F. Breitzman, Cedarbrook; Francis Narin, Ventor, both of NJ (US)

(73) Assignee: CHI Research, Inc., Haddon Heights, NJ (US)

( * ) Notice: Under 35 U.S.C. 154(b), the term of this patent shall be extended for 0 days.

(21) Appl. No.: 09/353,613

(22) Filed: Jul. 14, 1999

(51) Int. Cl.$^7$ .................................................. G06F 17/60
(52) U.S. Cl. ............................ 705/36; 705/10; 705/35; 705/37
(58) Field of Search ............................. 705/36, 10, 35, 705/37

(56) References Cited

U.S. PATENT DOCUMENTS

| | | | |
|---|---|---|---|
| 5,761,442 | * 6/1998 | Barr et al. | 705/36 |
| 5,819,238 | 10/1998 | Fernholz . | |
| 5,934,674 | * 8/1999 | Bukowsky | 273/278 |
| 5,978,778 | * 11/1999 | O'Shaughnessy | 705/36 |
| 6,035,286 | * 3/2000 | Fried | 705/36 |

OTHER PUBLICATIONS

"Techn File: Data Mining for the Soft Assets", Invester Relations Dec. 1996.*
Stobbs Gregory; "Tuning the Corporate Patent Portfolio Using the Latest Software Tools", MapiT Briefing Report, Manning & Napier, Jun. 1997.*
McGuire, Craig; "The Next Level of Proprietary Protection", Wall Street & Technology, Jan99, vol. 17 Issue 1, p52, 1p.*
J. S. Perko et al.; "The Transfer of Public Science to Patented Technology: A Case Study in agriculture Science", Journal of Technology Transfer, vol. 22(3) 65–72, 1997.*
CHI Research, Inc. Introduces Tech–Line Analysis Tool Technology, Information Today, v 15, n 9, p 66,Oct. 1998.*
Deng, Z., Lev, B., and Narin, F. "Science and Technology as Predictors of Stock Performance" (Financial Analysts Journal, vol. 55, No. 3, May/Jun. 1999, pp. 20–32).
Rosenberg, N. and Birdzell, Jr., L.E. "Science, Technology and the Western Miracle" (Scientific American, vol. 263, No. 5, Nov. 1990, pp. 42–54).

(List continued on next page.)

*Primary Examiner*—Tod R. Swann
*Assistant Examiner*—Jagdish N Patel
(74) *Attorney, Agent, or Firm*—Akin, Gump, Strauss, Hauer & Feld, L.L.P.

(57) ABSTRACT

A portfolio selector technique is described for selecting publicly traded companies to include in a stock market portfolio. The technique is based on a technology score derived from the patent indicators of a set of technology companies with significant patent portfolios. Typical patent indicators may include citation indicators that measure the impact of patented technology on later technology, Technology Cycle Time that measures the speed of innovation of companies, and science linkage that measures leading edge tendencies of companies. Patent indicators measure the effect of quality technology on the company's future performance. The selector technique creates a scoring equation that weights each indicator such that the companies can be scored and ranked based on a combination of patent indicators. The score is then used to select the top ranked companies for inclusion in a stock portfolio. After a fixed period of time, as new patents are issued, the scores are recomputed such that the companies can be re-ranked and the portfolio adjusted to include new companies with higher scores and to eliminate companies in the current portfolio which have dropped in score. A portfolio of the top 10–25 companies using this method and a relatively simple scoring equation has been shown to greatly exceed the S&P 500 and other indexes in price gain over a ten year period.

63 Claims, 11 Drawing Sheets

OTHER PUBLICATIONS

Griliches, Z. "Patent Statistics as Economic Indicators: A Survey" (Journal of Economic Literature, vol. XXVIII, Dec. 1990, pp. 1661–1707).

Deng, Z., Lev, B. and Narin, F. "Science & Technology as Predictors of Stock Performance" (In Press: Financial Analysts Journal, Feb. 15, 1999, Abstract & pp. 1–26).

Narin, F. and Noma, E. "Patents as Indicators of Corporate Technological Strength*" (Research Policy 16, 1987 pp. 143–155, North Holland).

Trajtenberg, M. "A Penny for Your Quotes: Patent Citations and the Value of Innovations" (Rand Journal of Economics, vol. 21, No. 1, Spring 1990 pp. 172–187).

Lev, B. and Zarowin, P. "The Boundaries of Financial Reporting and How to Extend Them" (Feb. 1998 pp. 1–51).

Albert, M.B., Avery, D., Narin, F. and McAllister, P. "Direct Validation of Citation Counts as Indicators of Industrially Important Patents" (Research Policy 20, 1991, pp. 251–259, North Holland).

Bronwyn, H.H., Jaffe, A. and Trajtenberg, M. "Market Value and Patent Citations: A First Look" (Apr. 1998. Paper prepared for the Conference on Intagibles and Capital Markets, New York University, May 15–16, 1998, pp. 1–34).

Thomas, P. "The Effect of Technological Impact Upon Patent Renewal Decisions" (Technology Analysis & Strategic Management, vol. II, No. 2, 1999, pp. 181–197).

Carpenter, M.P., Narin, F., and Woolf, P. "Citation Rates to Technologically Important Patents"(World Patent Information, vol. 3, No. 4, pp. 160–163, 1981).

Breitzman, A., and Narin, F. "A Case for Patent Citation Analysis in Litigation" (The Law Works, Mar. 1996, vol. 3, No. 3, pp. 10–11, pp. 26–27).

Narin, F., Hamilton, K.S. and Olivastro, D. The Increasing Linkage Between U.S. Technology and Public Science (Research Policy 26, 1997, pp. 317–330).

Narin, F., "Tech–Line® Background Paper" (To be published in: "Measuring Strategic Competence", Version of Aug. 19, 1998, pp. 1–49).

Coy, P. "Can You Really Beat the Market?" (Business Week, May 31, 1999, pp. 144 and 146).

* cited by examiner

Example of Main Table in Underlying Database

| Company Name | Industry Group Name | Year Ending | Stock Price Jan 1 | Stock Price Dec 31 | TCT | Normed TCT | Patent Growth 1 Year | Normed Patent Growth 1 Year | Current Impact Index (CII) | Normed CII | Science Linkage | Normed Scien. Linkage |
|---|---|---|---|---|---|---|---|---|---|---|---|---|
| 3COM Corp. | Computers | 1988 | #N/A | $5.00 | 8.50 | 1.35 | 1000.00 | 291.96 | 5.61 | 3.44 | 0.00 | 0.00 |
| 3COM Corp. | Computers | 1989 | $5.00 | $5.47 | 3.13 | 0.51 | 200.00 | 4.87 | 1.60 | 0.96 | 0.00 | 0.00 |
| 3COM Corp. | Computers | 1990 | $5.47 | $3.44 | 0.00 | 0.00 | -100.00 | -22.08 | 0.81 | 0.52 | 0.00 | 0.00 |
| 3COM Corp. | Computers | 1991 | $3.44 | $2.00 | 3.92 | 0.67 | 1000.00 | 41.32 | 1.54 | 1.01 | 0.00 | 0.00 |
| 3COM Corp. | Computers | 1992 | $2.00 | $2.81 | 4.00 | 0.66 | 0.00 | 0.00 | 0.77 | 0.47 | 0.00 | 0.00 |
| 3COM Corp. | Computers | 1993 | $2.81 | $7.41 | 6.25 | 1.06 | 0.00 | 0.00 | 1.95 | 1.15 | 0.00 | 0.00 |
| 3COM Corp. | Computers | 1994 | $7.41 | $11.75 | 5.00 | 0.84 | 550.00 | 26.51 | 3.64 | 2.18 | 0.15 | 0.22 |
| 3COM Corp. | Computers | 1995 | $11.75 | $25.78 | 4.54 | 0.76 | 77.00 | 5.74 | 2.88 | 1.67 | 0.70 | 0.78 |
| 3COM Corp. | Computers | 1996 | $25.78 | $46.63 | 5.45 | 0.92 | 30.00 | 1.20 | 4.06 | 2.21 | 0.30 | 0.31 |
| A O Smith Corporation | Automotive | 1988 | #N/A | $8.25 | 16.50 | 1.89 | 80.00 | 34.11 | 0.65 | 0.48 | 0.00 | 0.00 |
| A O Smith Corporation | Automotive | 1989 | $8.25 | $6.50 | 23.38 | 2.80 | -6.00 | -0.30 | 0.70 | 0.54 | 0.00 | 0.00 |
| A O Smith Corporation | Automotive | 1990 | $6.50 | $7.69 | 12.08 | 1.52 | 53.00 | 7.89 | 1.05 | 0.79 | 0.00 | 0.00 |
| A O Smith Corporation | Automotive | 1991 | $7.69 | $9.00 | 13.50 | 1.79 | -23.00 | -1.30 | 0.52 | 0.40 | 0.00 | 0.00 |
| A O Smith Corporation | Automotive | 1992 | $9.00 | $19.13 | 16.50 | 2.22 | -40.00 | -6.30 | 0.67 | 0.55 | 0.00 | 0.00 |
| A O Smith Corporation | Automotive | 1993 | $19.13 | $35.75 | 23.50 | 3.21 | 8.00 | 2.82 | 0.74 | 0.64 | 0.08 | 0.58 |
| A O Smith Corporation | Automotive | 1994 | $35.75 | $24.50 | 23.30 | 3.03 | -15.00 | -1.59 | 0.63 | 0.60 | 0.00 | 0.00 |
| A O Smith Corporation | Automotive | 1995 | $24.50 | $20.75 | 9.80 | 1.30 | -64.00 | 486.05 | 0.51 | 0.48 | 0.50 | 1.67 |
| A O Smith Corporation | Automotive | 1996 | $20.75 | $29.88 | 9.70 | 1.26 | 200.00 | 10.21 | 0.83 | 0.77 | 0.00 | 0.00 |
| A T & T Corp. | Telecommunications | 1988 | #N/A | $28.75 | 5.50 | 0.75 | 0.00 | 0.00 | 4.00 | 2.65 | 1.71 | 1.50 |
| A T & T Corp. | Telecommunications | 1989 | $28.75 | $45.50 | 4.25 | 0.64 | 0.00 | 0.00 | 4.97 | 3.31 | 2.00 | 1.84 |
| A T & T Corp. | Telecommunications | 1990 | $45.50 | $30.13 | 4.00 | 0.64 | 129.00 | 87.40 | 3.96 | 2.76 | 1.06 | 0.82 |

FIGURE 2 (Part 1 of 2)

Example of Main Table in Underlying Database

| Company Name | Industry Group Name | Year Ending | Stock Price Jan 1 | Stock Price Dec 31 | TCT | Normed TCT | Patent Growth 1 year | Normed Patent Growth 1 Year | Current Impact Index | Normed CII | Science Linkage | Normed Scien. Linkage |
|---|---|---|---|---|---|---|---|---|---|---|---|---|
| A T & T Corp. | Telecommunications | 1991 | $ 30.13 | $ 39.13 | 4.36 | 0.73 | -31.00 | -1.08 | 2.40 | 1.63 | 3.45 | 2.87 |
| A T & T Corp. | Telecommunications | 1992 | $ 39.13 | $ 51.00 | 4.05 | 0.69 | -18.00 | -2.24 | 3.05 | 1.94 | 1.44 | 1.38 |
| A T & T Corp. | Telecommunications | 1993 | $ 51.00 | $ 52.50 | 5.44 | 0.91 | 122.00 | 7.94 | 3.51 | 2.24 | 0.70 | 0.68 |
| A T & T Corp. | Telecommunications | 1994 | $ 52.50 | $ 50.25 | 4.28 | 0.76 | 85.00 | 4.34 | 2.88 | 1.65 | 1.38 | 1.23 |
| A T & T Corp. | Telecommunications | 1995 | $ 50.25 | $ 64.75 | 5.11 | 0.90 | 595.00 | 9.48 | 4.77 | 2.23 | 1.57 | 1.11 |
| A T & T Corp. | Telecommunications | 1996 | $ 64.75 | $ 43.38 | 5.37 | 0.99 | -8.00 | -0.42 | 2.93 | 1.44 | 1.43 | 0.97 |
| Abbott Laboratories | Pharmaceuticals | 1988 | #N/A | $ 6.02 | 8.69 | 1.05 | 14.00 | 3.10 | 1.29 | 1.50 | 1.98 | 1.19 |
| Abbott Laboratories | Pharmaceuticals | 1989 | $ 6.02 | $ 8.50 | 8.49 | 1.02 | 4.00 | 0.10 | 1.30 | 1.36 | 1.04 | 0.55 |
| Abbott Laboratories | Pharmaceuticals | 1990 | $ 8.50 | $ 11.25 | 8.30 | 0.95 | 39.00 | 22.74 | 1.26 | 1.50 | 2.87 | 1.46 |
| Abbott Laboratories | Pharmaceuticals | 1991 | $ 11.25 | $ 17.22 | 7.86 | 0.93 | 18.00 | 1.52 | 1.43 | 1.71 | 2.86 | 1.36 |
| Abbott Laboratories | Pharmaceuticals | 1992 | $ 17.22 | $ 15.19 | 7.43 | 0.91 | 61.00 | 4.94 | 1.48 | 1.73 | 2.25 | 0.74 |
| Abbott Laboratories | Pharmaceuticals | 1993 | $ 15.19 | $ 14.81 | 8.58 | 1.09 | 0.00 | 0.00 | 1.45 | 1.58 | 2.55 | 0.71 |
| Abbott Laboratories | Pharmaceuticals | 1994 | $ 14.81 | $ 16.31 | 7.85 | 0.99 | 9.00 | -1.62 | 1.30 | 1.52 | 2.01 | 0.55 |
| Abbott Laboratories | Pharmaceuticals | 1995 | $ 16.31 | $ 20.81 | 9.46 | 1.12 | -19.00 | -1.02 | 1.18 | 1.46 | 2.79 | 0.63 |
| Abbott Laboratories | Pharmaceuticals | 1996 | $ 20.81 | $ 25.38 | 8.08 | 0.94 | 54.00 | 2.16 | 1.20 | 1.50 | 3.38 | 0.50 |
| Actel Corp. | Semiconductors | 1993 | #N/A | $ 11.50 | 5.62 | 1.01 | -8.00 | -0.22 | 4.69 | 2.79 | 0.73 | 0.97 |
| Actel Corp. | Semiconductors | 1994 | $ 11.50 | $ 8.25 | 7.02 | 1.25 | 36.00 | 0.60 | 6.89 | 3.93 | 1.67 | 2.12 |
| Actel Corp. | Semiconductors | 1995 | $ 8.25 | $ 10.75 | 7.88 | 1.42 | 7.00 | 0.18 | 7.54 | 3.94 | 3.94 | 4.06 |
| Actel Corp. | Semiconductors | 1996 | $ 10.75 | $ 23.75 | 6.41 | 1.13 | 56.00 | 1.16 | 6.34 | 3.18 | 3.12 | 2.74 |

FIGURE 2 (Part 2 of 2)

Example Stock Selection for 1997 & 1998 Using 25 Companies and formula -9 Normed TCT + 2 Normed CII Buy 1997 Based on 1996 Indicators

| Company | Industry Group Name | Normed TCT | Normed Growth | Normed CII | Normed SL | Composite Score | Year-end 1996 Share Price | Year-end 1997 share price | Investment Year-end 1996 (dollars) | Shares Owned year-end 1996 | Year-end 1997 value (dollars) | 1 Year Return (Percent) |
|---|---|---|---|---|---|---|---|---|---|---|---|---|
| Morton Int'l Inc | Chemicals | 0.6 | 1.9 | 3.4 | 0.1 | 1.8 | $ 29.26 | $ 34.38 | 100.00 | 3.4 | 117.50 | 17.5 |
| Trimble Navig. | Electronics | 0.6 | 8.4 | 2.9 | 0.5 | 0.2 | $ 11.50 | $ 21.81 | 100.00 | 8.7 | 189.65 | 89.7 |
| Fuisz Tech. | Food&Tobacco | 1.4 | 0.9 | 6.6 | 1.5 | 0.2 | $ 7.88 | $ 8.50 | 100.00 | 12.7 | 107.87 | 7.9 |
| Isis Pharm. | Pharma. | 0.7 | 10.5 | 2.9 | 5.6 | -0.1 | $ 18.00 | $ 12.31 | 100.00 | 5.6 | 68.39 | -31.6 |
| PSC Inc. | Instr. & Optical | 0.7 | 1.1 | 2.7 | 0.2 | -1.2 | $ 7.13 | $ 13.19 | 100.00 | 14.0 | 184.99 | 85.0 |
| Applied Materials | Machinery | 0.7 | 2.3 | 2.3 | 3.0 | -1.7 | $ 17.97 | $ 30.13 | 100.00 | 5.6 | 167.67 | 67.7 |
| Qualcomm Inc | Telecom. | 1.0 | 6.2 | 3.5 | 0.6 | -2.4 | $ 39.88 | $ 50.50 | 100.00 | 2.5 | 126.63 | 26.6 |
| Enzon, Inc. | Biotechnology | 0.6 | -0.3 | 1.6 | 0.5 | -2.7 | $ 2.94 | $ 5.50 | 100.00 | 34.0 | 187.07 | 87.1 |
| Nexstar Pharm. | Biotechnology | 0.6 | 0.4 | 1.5 | 1.9 | -2.8 | $ 15.00 | $ 11.38 | 100.00 | 6.7 | 75.87 | -24.1 |
| Western Atlas | Engrng.,Oil Etc. | 0.8 | 3.9 | 2.0 | 0.8 | -3.2 | $ 70.88 | $ 74.00 | 100.00 | 1.4 | 104.41 | 4.4 |
| Procter&Gamble | Chemicals | 1.0 | 10.7 | 3.0 | 1.3 | -3.2 | $ 53.81 | $ 79.81 | 100.00 | 1.9 | 148.32 | 48.3 |
| EMC Corp | Computers | 1.1 | 9.0 | 3.3 | 1.5 | -3.3 | $ 16.56 | $ 27.44 | 100.00 | 6.0 | 165.70 | 65.7 |
| Church & Dwight | Chemicals | 0.9 | -6.1 | 2.3 | 0.0 | -3.5 | $ 22.88 | $ 28.06 | 100.00 | 4.4 | 122.64 | 22.6 |
| AST Research | Computers | 0.9 | 0.4 | 2.4 | 1.5 | -3.5 | $ 8.50 | $ 4.19 | 100.00 | 11.8 | 49.26 | -50.7 |
| Boston Scientific | Health Care | 0.9 | 0.8 | 2.0 | 0.9 | -3.6 | $ 30.00 | $ 22.94 | 100.00 | 3.3 | 76.47 | -23.5 |
| Actel Corp. | Semiconduct. | 1.1 | 1.2 | 3.2 | 2.7 | -3.8 | $ 23.75 | $ 12.63 | 100.00 | 4.2 | 53.18 | -46.8 |
| 3COM Corp. | Computers | 0.9 | 1.2 | 2.2 | 0.3 | -3.9 | $ 46.63 | $ 73.38 | 100.00 | 2.1 | 157.37 | 57.4 |
| Walbrow Corp. | Automotive | 0.9 | 1.8 | 2.2 | 0.0 | -4.0 | $ 18.25 | $ 13.44 | 100.00 | 5.5 | 73.64 | -26.4 |
| SPX CORP | Automotive | 0.7 | 1.9 | 1.2 | 1.4 | -4.0 | $ 38.75 | $ 69.00 | 100.00 | 2.6 | 178.06 | 78.1 |
| TRW Inc. | Automotive | 0.8 | 1.2 | 1.7 | 4.1 | -4.1 | $ 49.50 | $ 53.38 | 100.00 | 2.0 | 107.84 | 7.8 |
| Cabot Corp | Chemicals | 0.8 | -5.3 | 1.5 | 8.5 | -4.1 | $ 25.13 | $ 27.63 | 100.00 | 4.0 | 109.95 | 9.9 |
| Bell Atlantic | Telecom. | 1.0 | 5.2 | 2.4 | 1.4 | -4.2 | $ 32.38 | $ 45.50 | 100.00 | 3.1 | 140.52 | 40.5 |
| Microsoft Corp | Computers | 0.8 | 4.4 | 1.6 | 1.8 | -4.2 | $ 20.66 | $ 32.31 | 100.00 | 4.8 | 156.39 | 56.4 |
| Sun Microsys. | Computers | 0.8 | 3.1 | 1.4 | 1.5 | -4.2 | $ 25.69 | $ 39.88 | 100.00 | 3.9 | 155.24 | 55.2 |
| Apple Computer | Computers | 0.8 | 2.2 | 1.5 | 1.7 | -4.3 | $ 20.88 | $ 13.13 | 100.00 | 4.8 | 62.88 | -37.1 |
| | | | | | | | | | 2500.00 | | 3087.51 | 23.5 |

FIGURE 4 (Part 1 of 2)

Example Stock Selection for 1997 & 1998 Using 25 Companies and formula -9 Normed TCT+2 Normed CII
Buy 1998 based on 1997 Indicators

| Company | Industry Group Name | Normed TCT | Normed Growth | Normed CII | Normed SL | Composite Score | Year-end 1997 Share Price | Year-end 1998 Share price | Year-end 1997 Investment (dollars) | Shares Owned year-end 1997 | Year-end 1998 value (dollars) | 1 Year Return (Percent) |
|---|---|---|---|---|---|---|---|---|---|---|---|---|
| Morton Int'l Inc | Chemicals | 0.6 | -0.2 | 3.0 | 0.2 | 0.6 | $ 34.38 | $ 24.50 | 123.50 | 3.6 | 88.01 | -28.7 |
| Allergan Inc | Health Care | 0.7 | 0.4 | 3.0 | 2.8 | -0.4 | $ 33.56 | $ 64.75 | 123.50 | 3.7 | 238.28 | 92.9 |
| Isis Pharma. | Pharma. | 0.8 | 1.4 | 2.7 | 4.9 | -1.5 | $ 12.31 | $ 12.94 | 123.50 | 10.0 | 129.82 | 5.1 |
| Qualcomm Inc | Telecom. | 1.0 | 1.0 | 3.9 | 1.3 | -1.6 | $ 50.50 | $ 51.81 | 123.50 | 2.4 | 126.70 | 2.6 |
| Trimble Navig. | Electronics | 0.8 | 5.2 | 2.6 | 0.2 | -1.9 | $ 21.81 | $ 7.25 | 123.50 | 5.7 | 41.05 | -66.8 |
| Applied Material | Machinery | 0.7 | -0.1 | 2.2 | 2.3 | -2.0 | $ 30.13 | $ 42.69 | 123.50 | 4.1 | 174.98 | 41.7 |
| Enzon, Inc. | Biotechnology | 0.7 | 1.0 | 1.8 | 0.7 | -2.4 | $ 5.50 | $ 13.31 | 123.50 | 22.5 | 298.87 | 142.0 |
| Nexstar Pharma. | Biotechnology | 0.8 | 1.0 | 2.2 | 1.3 | -2.9 | $ 11.38 | $ 9.25 | 123.50 | 10.9 | 100.38 | -18.7 |
| Read-Rite Corp | Computers | 0.6 | 3.0 | 1.1 | 0.2 | -2.9 | $ 15.75 | $ 14.78 | 123.50 | 7.8 | 115.89 | -6.2 |
| Ralston Purina | Food&Tobacco | 0.8 | 1.5 | 1.9 | 0.2 | -3.5 | $ 30.95 | $ 32.13 | 123.50 | 4.0 | 128.21 | 3.8 |
| Dell Computer | Computers | 0.7 | 1.5 | 1.6 | 0.1 | -3.6 | $ 10.50 | $ 36.59 | 123.50 | 11.8 | 430.37 | 248.5 |
| EMC Corp | Computers | 1.0 | -3.2 | 2.6 | 0.9 | -3.6 | $ 27.44 | $ 85.00 | 123.50 | 4.5 | 382.56 | 209.8 |
| Xilinx Inc | Semicond. | 0.8 | 0.2 | 1.7 | 1.6 | -3.6 | $ 17.53 | $ 32.56 | 123.50 | 7.0 | 229.39 | 85.7 |
| Bell Atlantic | Telecom. | 1.0 | -15.0 | 2.6 | 0.7 | -3.9 | $ 45.50 | $ 54.00 | 123.50 | 2.7 | 146.57 | 18.7 |
| Microsoft Corp | Computers | 0.8 | 17.5 | 1.6 | 1.1 | -3.9 | $ 32.31 | $ 69.34 | 123.50 | 3.8 | 265.04 | 114.6 |
| Atlantic Richfield | Energy | 0.7 | 2.7 | 1.4 | 1.4 | -3.9 | $ 80.13 | $ 65.38 | 123.50 | 1.5 | 100.77 | -18.4 |
| Sun Microsys. | Computers | 0.8 | 5.3 | 1.4 | 1.3 | -4.1 | $ 39.88 | $ 85.63 | 123.50 | 3.1 | 265.18 | 114.7 |
| Procter&Gamble | Chemicals | 1.0 | 1.9 | 2.6 | 1.3 | -4.1 | $ 79.81 | $ 91.31 | 123.50 | 1.5 | 141.30 | 14.4 |
| Rockwell Intern. | Aerospace | 0.7 | 2.5 | 1.2 | 1.0 | -4.2 | $ 52.25 | $ 48.56 | 123.50 | 2.4 | 114.78 | -7.1 |
| Merck & Co Inc | Pharma. | 0.7 | 0.8 | 1.2 | 0.8 | -4.2 | $ 53.00 | $ 73.75 | 123.50 | 2.3 | 171.85 | 39.2 |
| Guidant Corp | Health Care | 0.8 | -0.5 | 1.6 | 0.8 | -4.3 | $ 31.13 | $ 55.00 | 123.50 | 4.0 | 218.20 | 76.7 |
| Altera Corp. | Semicond. | 0.9 | -0.8 | 1.9 | 2.2 | -4.4 | $ 33.13 | $ 60.88 | 123.50 | 3.7 | 226.95 | 83.8 |
| Donnelley (R.R.) | Miscellaneous | 0.6 | 0.9 | 0.5 | 1.0 | -4.5 | $ 37.25 | $ 43.81 | 123.50 | 3.3 | 145.25 | 17.6 |
| Boston Scientific | Health Care | 0.9 | -0.2 | 1.6 | 0.8 | -4.5 | $ 22.94 | $ 26.81 | 123.50 | 5.4 | 144.33 | 16.9 |
| Nalco Chemical | Chemicals | 0.9 | 0.0 | 1.6 | 0.6 | -4.7 | $ 39.56 | $ 31.00 | 123.50 | 3.1 | 96.78 | -21.6 |
| | | | | | | | | | 3087.51 | | 4521.52 | 46.4 |

FIGURE 4 (Part 2 of 2)

Comparison of 4 Equations Predicting 1 Year Ahead for 25 Companies

| Formula | Companies Selected | Average Return | Avg. Return First 5 Years | Avg. Return Last 5 Years | Value in 1998 (Assuming $1000 invested in 1989) | Best Return Year | Worst Return Year | Average % of Companies with Positive Return | Average % of Companies with Return Exceeding 10% | Average Return After Removing Best Returning Company |
|---|---|---|---|---|---|---|---|---|---|---|
| -25 Normed TCT + 4 Normed CII | 25 | 33% | 33% | 32% | $ 16,250 | 50% | 21% | 66% | 55% | 26% |
| -55 Normed TCT + 1 Normed Growth + 2 Normed CII + 3 Normed SL | 25 | 32% | 35% | 30% | $ 15,539 | 56% | 17% | 70% | 56% | 26% |
| -77 Normed TCT + 1 Normed Growth + 9 Normed CII - 3 Normed SL | 25 | 33% | 33% | 31% | $ 16,414 | 57% | 15% | 66% | 55% | 26% |
| -9 Normed TCT + 2 Normed CII | 25 | 33% | 33% | 32% | $ 16,417 | 52% | 18% | 67% | 56% | 25% |

FIGURE 8

METHOD AND APPARATUS FOR CHOOSING A STOCK PORTFOLIO, BASED ON PATENT INDICATORS

BACKGROUND OF THE INVENTION

1. Field of the Invention

The present invention relates to a financial data processing system and method for selecting an investment portfolio of companies with substantial price appreciation potential, based on a newly discovered association between stock price appreciation and the technological strengths of the companies, where technological strength is measured through indicators derived from the companies' patent portfolios. More particularly, the systems and methods of the present invention rank companies by a technology score derived from an analysis of at least the number and growth rates of company patents, citations to company patents from later patents, the references from company patents to earlier patents and research papers, and historical stock price appreciation. Because these technology strength indicators have not heretofore been available to investors, they allow technologically undervalued and technologically overvalued companies to be identified, and allow investors to assemble a portfolio of technologically undervalued stocks which should substantially "beat the market", and to avoid investing in companies which are technologically overvalued in the market.

2. Prior Art

In the last decade of the 20$^{th}$ Century it has become widely accepted that invention and innovation are fundamental forces driving the U.S. high-technology economy, and that much of the growth in the Western Economies can be traced to the close links between the growth of scientific knowledge and the use of technology. (See N. Rosenberg, and L. E., Birdzell, Jr. "Science, Technology and the Western Miracle." *Scientific American* 263 (5) [1990] 42–54.) While this has been clearly perceived at the national policy level and in the aggregate by the general rise of technology stocks, direct linkage of company technology and stock price has remained elusive. In particular, although empirical research has established that corporate patenting is associated with subsequent gains in firms' productivity (see Zvi Griliches, "Patent Statistics as Economic Indicators: A Survey." *Journal of Economic Literature* 28 [1990] 1661–1707), this general relationship has not yet been applied to stock portfolio selection, although contemporary research indicates that this is likely to be successful. (See Zhen Deng, Baruch Lev and Francis Narin. "Science & Technology as Predictors of Stock Performance." *Financial Analysts Journal*, 55 [May/June 1999] 20–33), and Francis Narin, Elliot Noma, and Ross Perry, "Patents as Indicators of Corporate Technological Strength." *Research Policy*, 16, [1987] 143–155).

Part of the reason that stock pricing models have not focused on technology is that public information about firms' R&D activities is inadequate for the purpose of investment analysis. The firm's periodic R&D expenditures, the sole innovation-related item required to be disclosed in financial statements, is too coarse an indicator of the nature, quality and expected benefits of its science and technology. Firms generally do not disclose information about the nature of their science and technology, nor can investors glean from R&D cost data the substantial differences that exist across firms in innovative capabilities. Furthermore, various innovative activities, particularly in small companies, are not formally classified as R&D, and hence are not reported separately to investors. Consequently, publicly available information on firms' science and technology is inadequate for assessing the capabilities of firms to innovate and the impact of such innovations on future corporate performance. Patent citation analysis provides a potentially important tool for overcoming many of these data inadequacy problems.

The extensive documentation accompanying patent applications includes a wealth of information from which various aspects of the quality of firms' science and technology can be learned. Of particular relevance are the references cited in the patent documents which identify earlier inventions ("prior art"), in the form of previous patents or scientific papers and articles relevant to the extant patent application.

Economists have in recent years examined the usefulness of patent citations as output measures of firms' innovative activities, supplementing R&D expenditures, which are an input measure. For example, it has been shown that the intensity of citations to a set of patents in subsequent patents was related to the social gains from the examined patents. (See Manual Trajtenberg. "A Penny for your Quotes: Patent Citations and the Value of Innovations," *Rand Journal of Economics* 21, [1990] 172–187). Other research has shown that patents highly ranked by industry staff were more frequently cited than patents of lower rank, (see Michael B. Albert, Daniel Avery, Paul McAllister, and Francis Narin. "Direct Validation of Citation Counts as Indicators of Industrially Important Patents," *Research Policy,* 20 [1991] 251–259) and that the intensity of citations to firms' patents is associated with their market values. (See Bronwyn H. Hall, Adam Jaffe, and Manuel Trajtenberg. "Market Value and Patent Citations: A First Look." Paper prepared for the Conference on Intangibles and Capital Markets, New York University, [1998]). Recent work also shows that patent renewal and citation frequency are correlated (see Patrick Thomas. "The Effect of Technological Impact Upon Patent Renewal Decisions," *Technology Analysis & Strategic Management, II,* 2, [1999] 181–197) while an early paper showed that patents associated with important inventions were twice as highly cited as control patents. (See Mark P. Carpenter, Francis Narin and Patricia Woolf. "Citation Rates to Technologically Important Patents," *World Patent Information* 4, [1981], 160–163). Finally, pioneering patents were found to be cited 5 times as frequently as ordinary patents. (See Anthony Breitzman and Francis Narin. "A Case for Patent Citation Analysis in Litigation," *Law Works,* 3, 3, [March 1996] 10–11, 25–26). Prior evidence thus substantiates patent citations as valid indicators of firms' science and technology.

The fundamental idea underlying the economic analysis of patent citations is that a large number of citations to an earlier patent from later patents indicates that the earlier patent is an important invention, one that has led to numerous subsequent technological improvements. It follows, that a company whose patent portfolio contains a large number of highly cited patents is one that is generating innovative technology, likely to yield important inventions and successful products. Thus, one would expect that companies whose patents are highly cited would tend to be more successful innovators and perform better in both the real and capital markets than companies whose patents are less frequently cited.

Other attributes of patent citations may indicate additional aspects of the quality of firms' science and technology. One such attribute is the "Science Linkage" of a company's patents, which indicates the number of references in the firm's own patent applications to scientific papers, as distinct from references to previous patents. (See Francis Narin, Kimberly S. Hamilton and Dominic Olivastro. "The Increasing Linkage between U.S. Technology and Public Science," *Research Policy,* 26.3, [1997] 317–330). Science Linkage thus indicates how close to science, or to basic research the fins R&D activities are. Science Linkage is very industry dependent: close to zero in mechanical technologies and up to 15 or more in advanced biotechnologies.

In general, companies that are innovating rapidly should be more successful in product development and marketing than firms relying on old technologies. This leads to another citation indicator, "Technology Cycle Time," which measures the median age of the U.S. patents cited in the firm's patents. A tendency to cite mature patents indicates that the firm engages in old technology. Note that this measure too is industry dependent. Technology Cycle Time is as short as three to four years in rapidly changing industries, such as electronics, and as long as 15 years in slow moving technologies, such as ship building. In drugs and medicine, the Technology Cycle Time tends to be eight to nine years, which is in the middle range of the overall Technology Cycle Time distribution, implying that important advances in drugs and medicine are not coming from rapid increments in technology, but rather from basic scientific research. A comprehensive discussion of these indicators are contained in the background material to the Tech-Line® database (see Francis Narin. "Tech-Line® Background Paper, In: Measuring Strategic Competence," Imperial College Press, Technology Management Series, Professor Joe Tidd, Editor [1999]).

The need for adequate consideration of technology in stock selection is growing. Professor Baruch Lev asserts that it is becoming more apparent that purely financial indicators are of less and less precision in estimating the future performance and the stock value of a company, presumably because the quality of company's technological accomplishments, and the inventive capital it is building up through its patent portfolio, trademarks, trade secrets, and other non-financial capital, are becoming more and more significant components of company performance. (see Baruch Lev and Paul Zarowin, "The Boundaries of Financial Reporting and How to Extend Them" Presented at The Conference on Intangibles and Capital Markets, NYU May 13, 1998)

Despite the obvious attractiveness of using technology indicators in stock market analysis, there are some formidable barriers to using these techniques in stock selection which are just now being overcome.

Not the least of these barriers is the problem of matching patent assignee names to individual companies. Companies patent under many different names such as divisional names, and joint ventures, even when those patents are ultimately owned by a single company. In addition, accounting for mergers, acquisitions, and divestitures is a major challenge. For example, the 1,100 heavily patenting institutions covered in CHI Research's Tech-Line® database, including approximately 500 U.S. and 500 foreign companies, patent under more than 20,000 different assignee names, so that assignee unification is an important first step in the application of patent analysis to stock selection.

In addition, large numbers of patents are reassigned from one company to another, because of mergers and acquisitions and for other reasons, and the hundreds of thousands of reassigned patents should also be assigned as accurately as possible to the company that actually currently owns them.

In summary, background research provides a strong rationale for the expectation that companies with strong patent portfolios would perform better in the market, and that if a method could be devised to accurately measure the quality of company technology, then one would expect that this have a significant predictive effect on company stock performance. Furthermore, information of this type should be particularly valuable because it is not currently available to market analysts, leading to a strong likelihood that the quality of company technology might not be properly valued in the market.

The data processing system and methodology revealed in this patent solves this problem.

BRIEF SUMMARY OF THE PRESENT INVENTION

A computer-implemented process is provided for selecting a portfolio of company stocks for a client which is predicted to have future performance that achieves a predesired financial outcome. In the process, a score is calculated for a plurality of companies whose stock may be potentially selected to be in the portfolio by using the equation:

$$\text{score} = \sum_{i=0}^{k-1} \alpha_i x_i^{\beta_i}$$

wherein $x_i$ are company indicators which include patent indicators, $\alpha_i$ are weighting coefficients for the respective company indicators, and $\beta_i$ are weighting exponents. At least one of the weighting coefficients are non-zero. The weighting coefficients are selected so that companies which receive a high score are predicted to contribute to achieving the predesired financial outcome. Companies which receive a low score are predicted to not contribute to achieving the predesired financial outcome. The calculated scores are ranked from highest to lowest. Then, recommendations are generated of which company stock to purchase for the portfolio based upon the ranking. The recommendations are displayed on a summary report for review by the client or the client's financial manager, or amounts of company stock are bought for the portfolio or sold from the portfolio in accordance with the recommendation. The recommendations of which company stock to purchase for the portfolio may be based upon the companies having the highest scores. Changes in scores over a selected time period may also be used to select stocks to buy and sell. The "client" referred to above may be a potential or actual investor, a broker or a fund manager.

After considering the following description, those skilled in the art will be able to use the teachings of the present invention to select a stock portfolio based on the R&D strengths of companies as measured through patent indicators.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. However, the present invention is not limited to the precise arrangements and instrumentalities shown. In the drawings:

FIG. 2 is database of a set of patent performance indicators for publicly traded companies with significant patent portfolios and a set of historical stock prices;

FIG. 4 is a spreadsheet showing scores for selected companies as determined by the stock selecting process of FIG. 3, as well as one year returns for the companies;

FIG. 8 is a spreadsheet showing financial returns associated with four different scoring equations.

DETAILED DESCRIPTION OF THE INVENTION

Certain terminology is used herein for convenience only and is not to be taken as a limitation on the present invention.

MAIN EMBODIMENT

Figure 1:
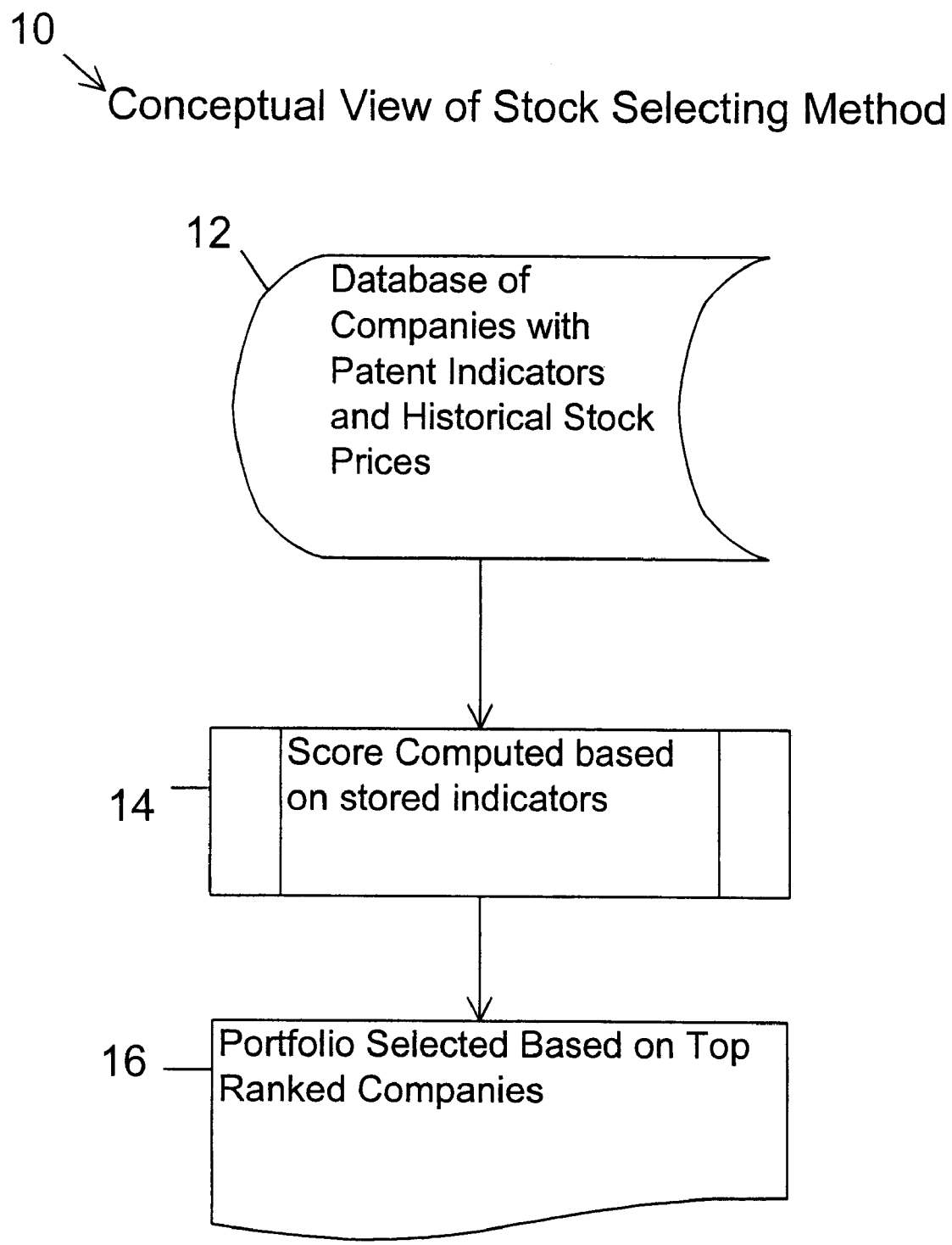
FIG. 1 is a combined schematic block diagram/high level flowchart of the main elements/steps of the portfolio selecting process.

FIG. 1 is a combined flowchart/schematic block diagram of the main steps/elements of the portfolio selecting system in the most basic embodiment of the system. The system 10 includes a database 12 listing publicly traded companies along with various patent performance indicators. From this database, a scoring mechanism 14 is used to rank the companies based on technological strength as measured by the patent indicators. The top ranked companies are then selected to include in the stock portfolio (block 16).

The components of FIG. 1 are discussed below in detail, and a simple example is provided that significantly outperforms the S&P 500 index. The underlying database 10 includes a set of patent performance indicators for publicly traded companies with significant patent portfolios and a set of historical stock prices.

FIG. 2 shows a view of the data contained in this database. A method is described below for building this database.

For illustration, the companies and patent indicators in CHI's publicly available Tech-Line® database are used. Tech-Line® contains 1100+ companies with 50 or more U.S. patents in the last 5 years. This is a U.S. patent database, but there is no reason why this method will not work in other patent systems, and the scope of the present invention includes other patent systems.

In whatever patent database that is used, particular care must be made to unify the assignee (company) names within the database so that an accurate set of patent indicators can be generated for each company. For example, IBM and Merck each have patented under more than 15 different names in the last 15 years, and AT&T has patented under more than 40 names in the period. The unification of assignee names can be accomplished by finding parent subsidiary relationships for companies via company web sites, annual reports, or by looking up company affiliations in books such as Who-Owns-Whom, (The Directory of Corporate Affiliations™, National Register Publishing), Corptech® (The Directory of Technology Companies, Published by Corporate Technology Information Services) or Moody's International Manual, published by Moody's Investor Services.

Each company within the database should be assigned to an industry (e.g., Telecommunications, Chemical, Pharmaceutical, etc.). These will be used for industry normalizations because patent indicators vary significantly from industry to industry.

Next, patent indicators for each company are computed. The illustration uses the five main indicators from the Tech-Line® database, as well as five industry-normalized versions derived from the original versions, although one could easily add other patent indicators. For completeness, the definitions of each indicator are provided here modified slightly from the Tech-Line® background paper.

1. Number of Patents

This indicator counts the number of U.S. utility (Type 1) patents granted to the companies in a given time period. It is a measure of the extent of the technological activity undertaken by a particular company.

2. % Patent Growth 1 Year

Patent growth measures the percentage change in the number of patents compared with the previous year. It is a measure of how the technological activity of a company is changing over time.

3. Current Impact Index (CII)

A fundamental indicator of technological impact is how frequently a patent is cited by later patents. As discussed in the background section above, when a patent is heavily cited by later patents, this is a sign that the cited patent represents an important technological advance.

In simple terms, the CII measures how often a particular company's patents are cited, compared with the average for the overall patent system. A company with many highly cited patents is regarded as being in a strong position technologically.

In more formal terms, the current CII for a particular company is calculated based upon the number of times patents issued this year cite the patents issued to the chosen company in each of the previous five years. The number of citations is then divided by the number of patents issued to the company in each of those five years, in order to produce an average citation rate. This rate is then divided by the average citation rate for all U.S. patents issued in each year during the same time period, in order to derive the Current Impact Index.

The net result of this calculation is that when the Current Impact Index equals 1.0, this shows that the last five years of a company's patents are cited as often as expected, compared to all U.S. patents. A CII of 1.1 indicates 10 percent more citations per patent than expected, and so forth.

Note that CII is a synchronous indicator, and moves with the current year, looking back five years. As a result, when a company's patents from recent years start to drop in impact, this is picked up quickly as a decline in the current year's CII. CII's are somewhat industry dependent, tending to be higher in very active areas such as electronics.

4. Science Linkage (SL)

Science Linkage measures the average number of citations that a company's patents make to scientific papers and similar research publications. Science Linkage is therefore an indicator of how closely a company's patents are linked to cutting-edge scientific research. Science Linkage is very industry dependent, ranging from close to zero in mechanical areas to 15 or more per patent in advanced biotechnology areas.

5. Technology Cycle Time (TCT)

Technology Cycle Time (TCT) is defined as the median age in years of the U.S. patents cited on the front pages of a company's patents. Technology Cycle Time is thus the time that has elapsed between the current patents and the previous generation of patents. Since the cited earlier technology represents the prior art, TCT is essentially the cycle time between the prior art and the current technology. A company with a low TCT is building upon relatively new technology, and is therefore innovating rapidly.

Technology Cycle Time varies from technology to technology. Relatively hot technologies such as electronics have short cycle times of around four years, compared to slow moving technologies such as ship and boat building with TCT's of 15 or more years.

The industry-normalized versions of the indicators are computed by taking the indicator value for each company and dividing by the industry average for the company's industry. For example, suppose there are 30 companies in the chemical industry with an average Science Linkage of 3.7, then the normalized Science Linkage for each chemical company will be that company's Science Linkage divided by 3.7. In this way, the industry effects can be removed from each company's indicators so that our portfolio will pick the best performing companies within each industry. The industry-normalized indicators used are:

1. Industry Normalized Number of Patents
2. Industry Normalized % Patent Growth 1 Year
3. Industry Normalized Technology Cycle Time
4. Industry Normalized Science Linkage
5. Industry Normalized Current Impact Index It is desirable to have all of the significant patenting entities from each industry included in the normalization base, even if they are not publicly traded, in order to compute a reasonable industry average. Thus industry averages are computed via the entire 1100+ companies in the 1998 version of Tech-Line®, even though only 292 are publicly traded.

The industry-normalized indicators are useful for picking portfolios containing companies that come from more than one industry. The normalization is necessary since patent indicators vary by industry. For example, the average biotech company has a Science Linkage of 15 and the average automotive company has a Science Linkage of less than 1. By removing the industry effects, companies can be identified that have above average Science Linkages for their industry. For example, relative to its industry, an automotive company with a Science Linkage of 4 is more science linked than a biotech company with a Science Linkage of 8.

Once the normalized patent indicators are derived for the publicly traded companies, all other companies may be removed from the database. In the example database, 292 companies traded in the NYSE, AMEX, and NASDAQ exchanges are used. Not all 292 companies are available in all years, so the net result is that in any given year, picks are made from a set of 250+ companies.

Next, the historical stock prices for each period are added. This information is publicly available from a number of sources.

At this stage, the main company table will have the fields listed in FIG. 2, and the number of records will be the number of companies times the number of time periods covered. In the example database, the patent indicators are computed yearly for 1989–98, but there is no reason why the indicators cannot be computed more often.

The scoring mechanism and the actual stock selecting algorithm is discussed next. Consider a composite impact score $$score = \sum_{i=0}^{k-1} \alpha_i x_i$$

where the $\alpha_i$ are weighting coefficients and the $x_i$ are the various patent indicators found in FIG. 2. Note that many of the $\alpha_i$ may be 0 but at least one of the $a_i$ are non-zero. Also, in this example, $\beta=1$ for i=0 to i=k−1 so $\beta_i$ does not appear in the equation.

As an example, if one chooses score =−9*Normed TCT+ 2* Normed CII, a score of −5.27 is obtained for 3Com for the year ending 1988 (see FIG. 2). For illustration, assume that one wishes to pick a portfolio for 1999 based on 1998 patent and financial indicators and that an equation for computing the score has already been picked. The following algorithm is performed, as set forth in detail in FIG. 3. (In FIG. 3, element 18 is a key component of element 14 in FIG. 1.)

Step 1. Using the known equation, compute the 1998 score for each listed company in the database.

Step 2. Rank the companies by score.

Step 3. Pick the top N companies based on Score.

Step 4. Buy equal dollar amounts of each company and hold for a desired period of time, such as 1 year.

A detailed example using the following scenario is given below:

1. 25 Companies are selected based on the following equation: −9*Normalized TCT+2*Normalized CII
2. Equal dollar amounts of selected companies are purchased in January of year 1997 based on indicators of year 1996.
3. Companies are held for 1 year, then step 1 is repeated to predict 1998 performance.

FIG. 4 is a spreadsheet which shows the computation of the score based on the above equation, for the top ranking companies of 1996 and 1997, and the return generated for 1997 and 1998 using the above scenario with $100 invested in each company.

Figure 5:
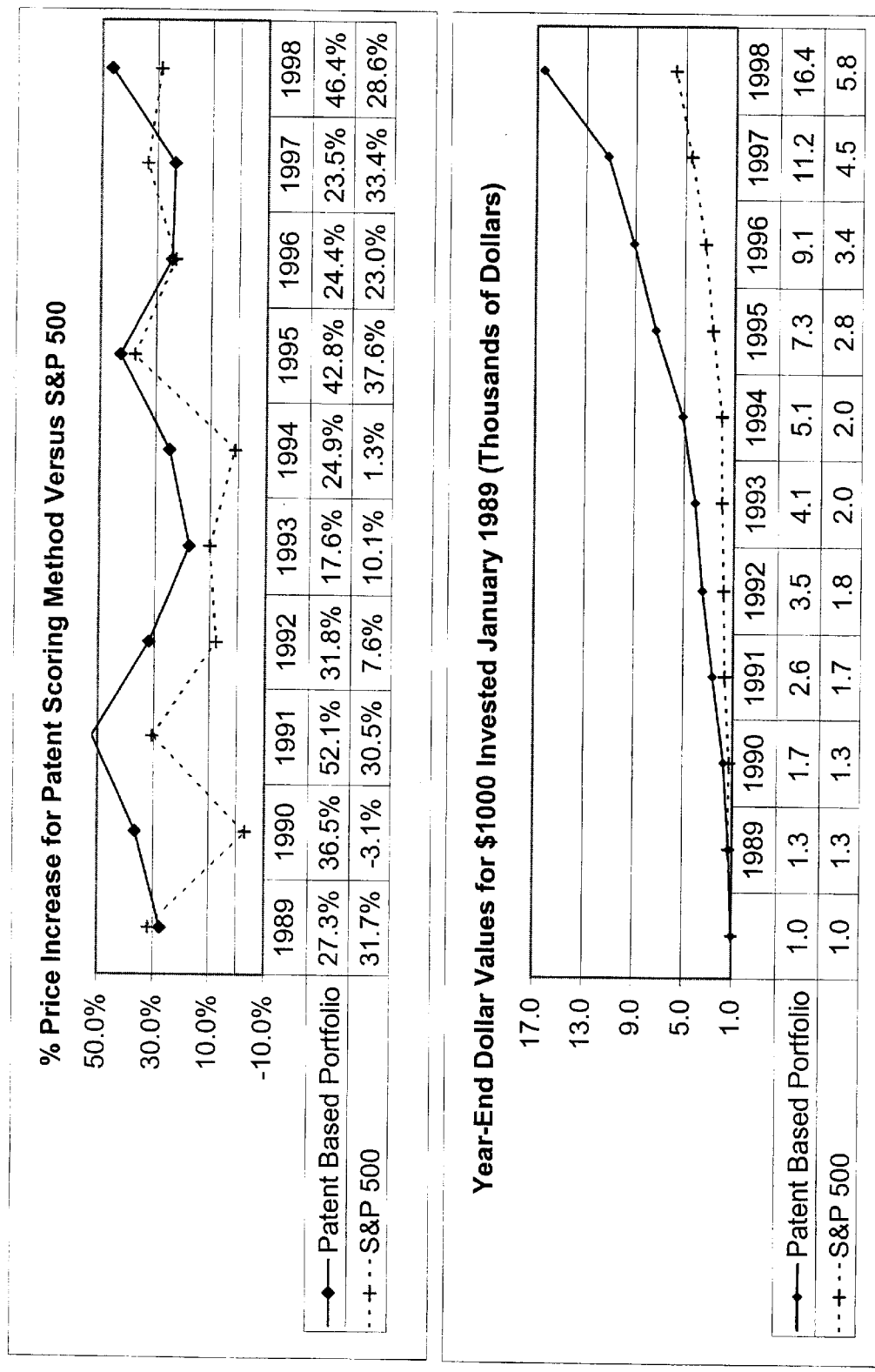
FIGS. 5 and 6 show financial returns for companies analyzed using the stock selecting process, compared to benchmark financial return indicators.

The top part of FIG. 5 shows the annual return for this scenario for the top 25 companies compared with the S&P 500 for a 10 year period. The bottom part of FIG. 5 shows the cumulative return for the 10 year period. Note that FIG. 5 assumes that stocks are purchased on January 2 at the closing price of December 31, and then held until the following December 31. This is a reasonable because the exchanges are closed on January 1. However, for practical reasons, one may have to wait until the first or second week of January to purchase the stock since the patents issued through December 31 will not be available to compute indicators until that time. An equivalent alternative process would be to base the rankings on patents issued through the third week of December, rather than for a full year. In either case, the performance shown in FIG. 5 would not change significantly.

Figure 6:
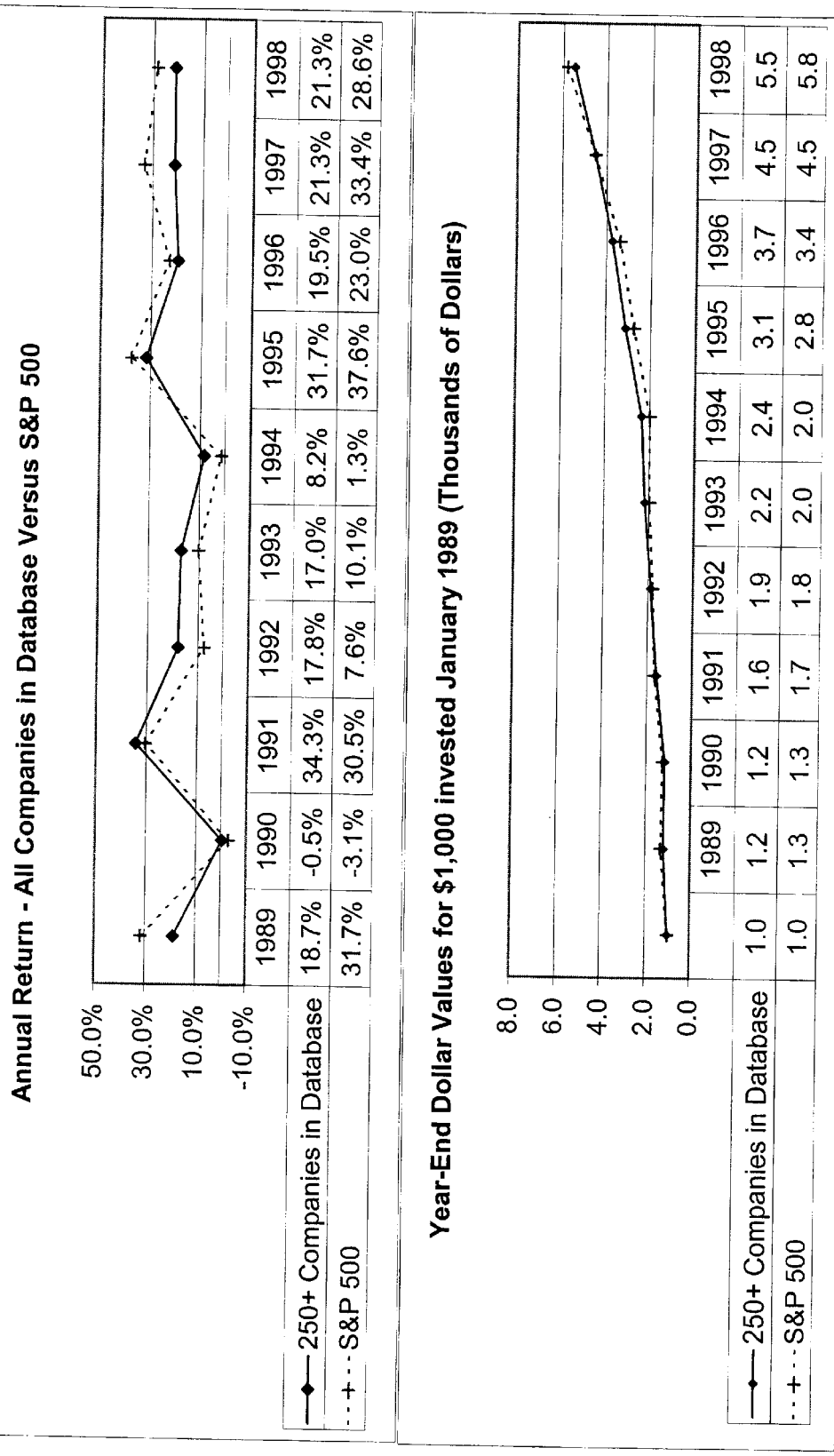

For background, FIG. 6 shows the return of the entire 250+ companies versus the S&P 500. Note that these are rather similar, indicating that the companies in the original set do not necessarily beat the market, but that the method of the present invention consistently selects a subset that will beat the market.

Beating the S&P 500 index is a significant achievement. The S&P 500 index has outperformed 90% of all actively managed mutual funds over the last 3, 5, and 10 year periods. (See Peter Coy "Can You Really Beat the Market", *Business Week,* May 31, 1999). FIG. 5 shows that the method of the present invention has significantly outperformed the S&P 500 in the last 3, 5 and 10 year periods, indicating that it has outperformed more than 90% of all actively managed funds in the periods.

The procedure above assumes a previously selected equation. The method for deriving such an equation is discussed next.

Figure 3:
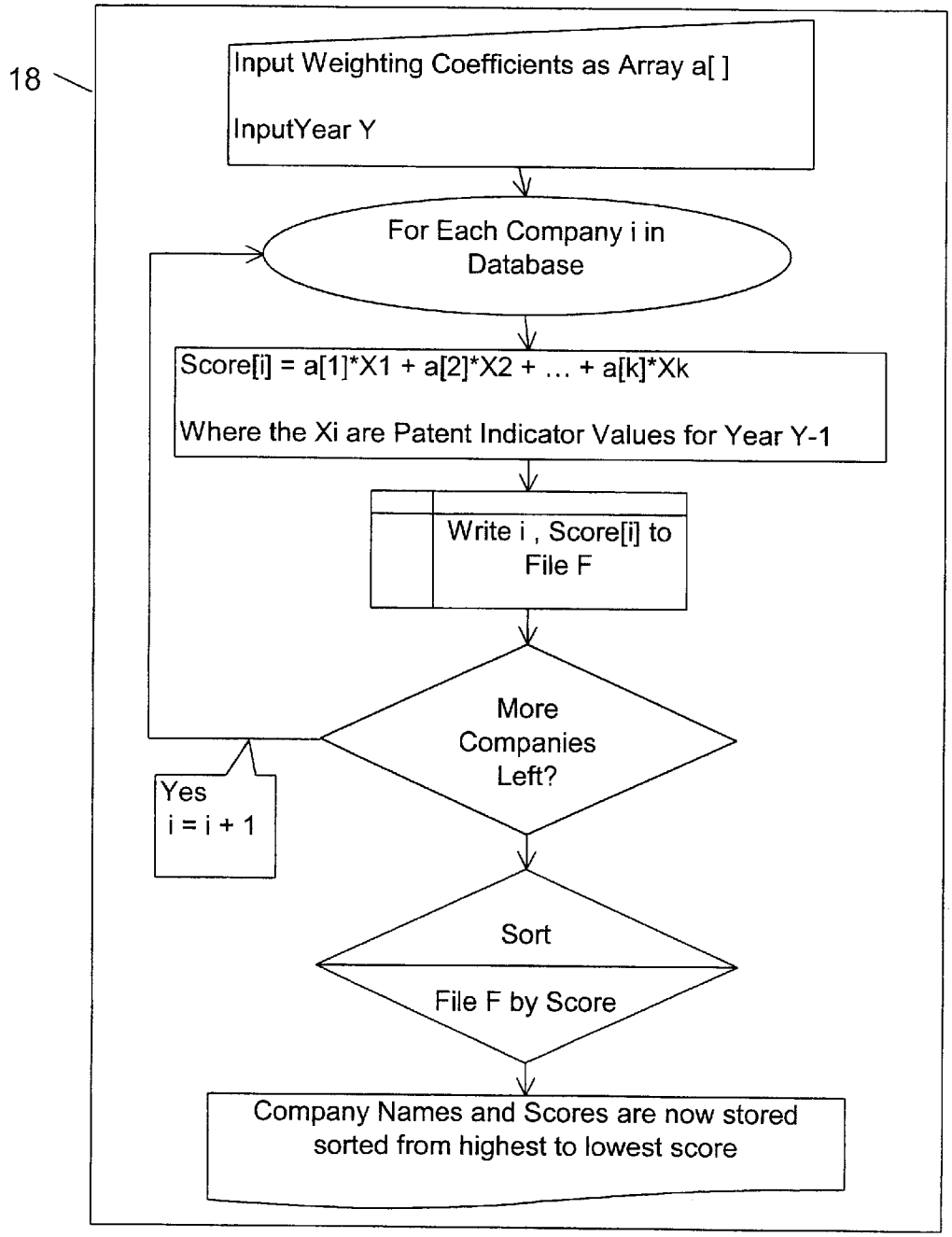
FIG. 3 is a detailed data flowchart of the stock selecting process.

For any given equation, an average desktop computer can follow the algorithm in FIG. 3 for a set of companies over a fixed time period and thus compute an average annual return in less than a second. Thus, in theory it is possible to compute every reasonable combination of coefficients within a specified period of time in order to maximize the return.

The example equations used in the present description of the invention were found with a 2-stage Monte-Carlo method. In the first stage, coefficients are randomly selected between −100 and +25 for Normalized TCT, −50 and +50 for Normalized Science Linkage, −25 and +25 for normalized growth, and −25 to +100 for normalized CII. All other indicator coefficients were allowed to stay at 0. A computer ran 50,000 random simulations and recorded all equations that returned 25% annually for 10 years. From an analysis of the outputs, a better range for the coefficients was determined as follows:

Normalized TCT: −100 to 0

Normalized Science Linkage: −15 to 15

Normalized CII: 0 to 25

Normalized Growth: −10 to 10.

Next, the computer ran 200,000 random simulations within those ranges and recorded equations that satisfied various scenarios and had better than average returns.

Figure 7:
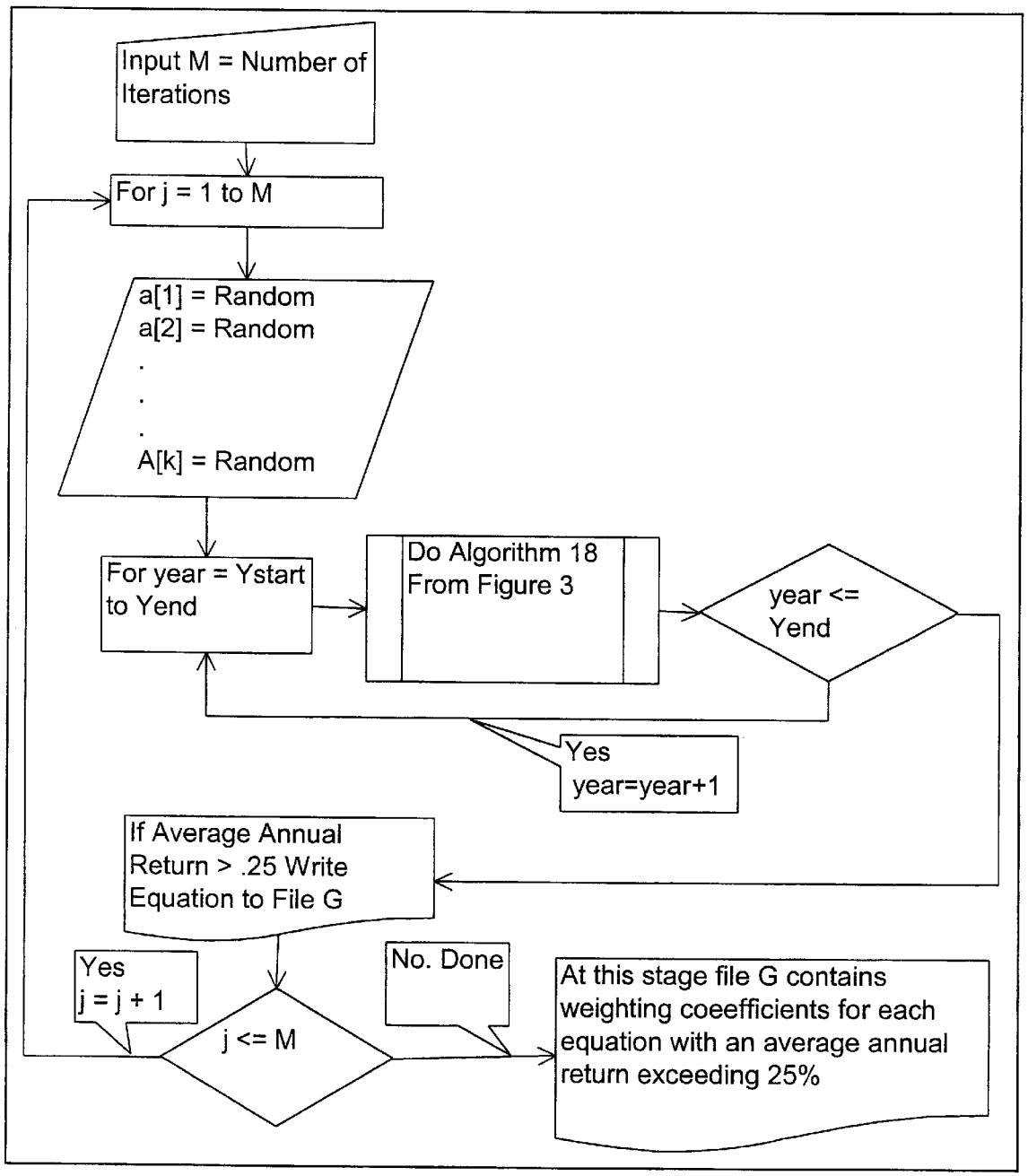
FIG. 7 is a detailed flowchart showing how weighting coefficients are determined for use with the scoring equation.

A block diagram showing an algorithm for deriving the equation is shown in FIG. 7. FIGS. 3 and 7, when taken together, completely describe the score computing process 14 of the overview FIG. 1.

Optimum coefficients may be found using more efficient and faster methods such as linear programming, dynamic programming, a fitting algorithm such as multiple regression, and other methods. The means of selecting the actual coefficients is not crucial to the present invention, and the scope of the invention includes any suitable method. Advantages of the Monte-Carlo method are that it is easy to understand and implement and it generates a number of above average solutions, rather than a single optimal solution. This is more desirable because it allows portfolio selections subject to additional constraints as discussed below.

ALTERNATIVE EMBODIMENT 1

Patent indicators alone were used as a test case and for the purposes of illustration. Adding additional indicators, such as traditionally used financial indicators, (e.g., sales, earnings per share, R&D intensity, etc.) to the underlying database and scoring algorithm will improve the results.

ALTERNATIVE EMBODIMENT 2

Computational speed can be gained by changing the equation derivation algorithm to a more efficient algorithm such as Linear Programming, Dynamic Programming, Multiple Regression, or other optimization methods.

ALTERNATIVE EMBODIMENT 3

Additional constraints may be added to the portfolio selector such that instead of merely optimizing for overall performance, the algorithm will pick a portfolio that not only provides superior returns, but also has other desirable traits for a particular investment style. Some examples include picking portfolios that have a low amount of volatility, companies that are suitable for short term or long term investment, and companies that largely come from specific industries.

FIG. 8 examines 4 scoring equations that provide similar long-term returns. However, note that the simple equation −25 Normed TCT+4 Normed CII, while providing a slightly less overall return than the equation −77 Normed TCT+1 Normed Growth+9 Normed CII−3 Normed SL, is less volatile in terms of best year versus worst year.

Figure 9:
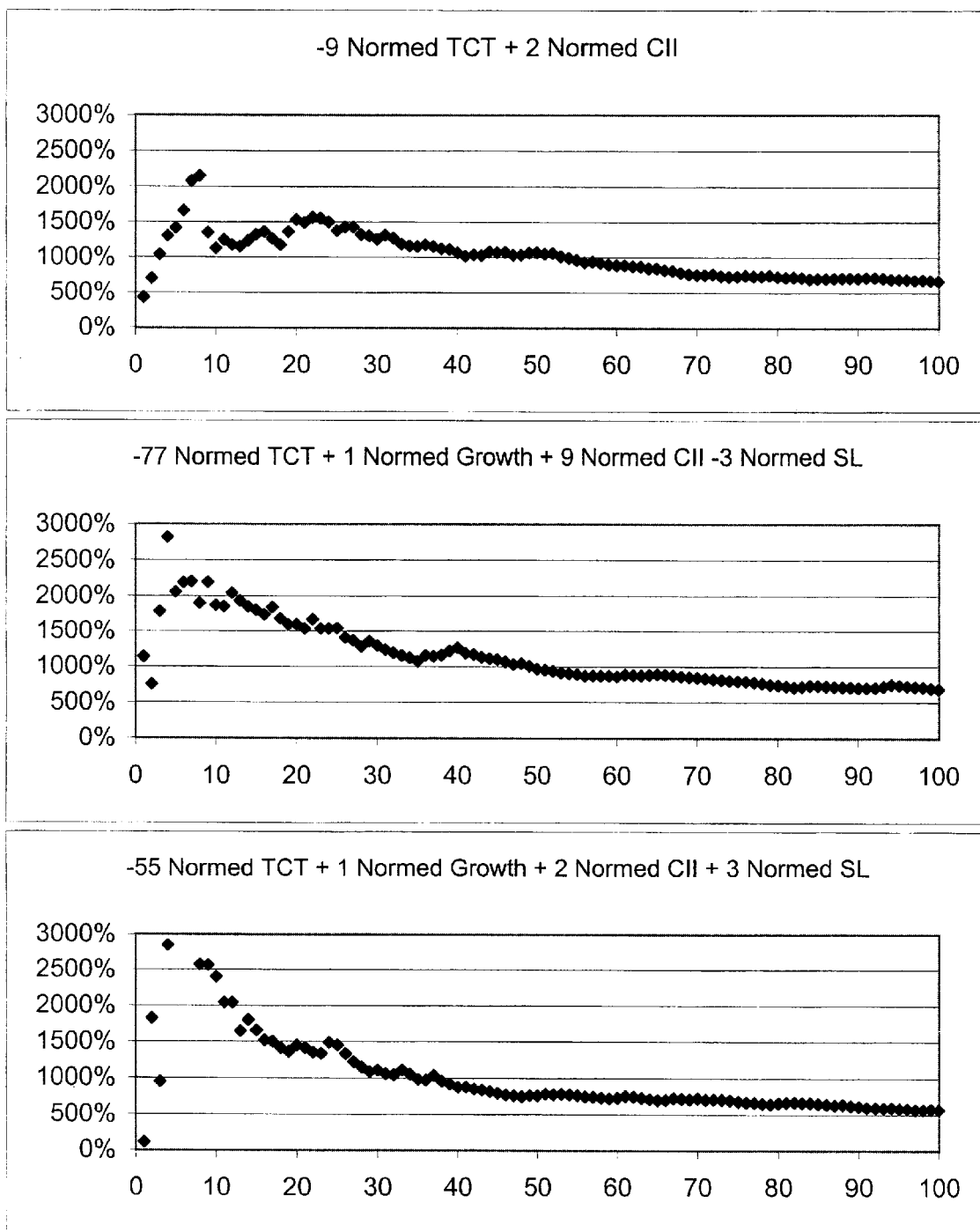
FIG. 9 shows graphs of financial returns vs. number of companies for three different scoring equations.

Another example in FIG. 9 shows that some scoring methods are more suitable for small portfolios than others. The equations in FIG. 9 all have an average 10 year return above 31% for portfolios of 25 companies. However, note that for smaller portfolios (i.e. between 10 and 25 companies), the equation −55 Normed TCT+1 Normed Growth+2 Normed CII+3 Normed SL performs much better.

ALTERNATIVE EMBODIMENT 4

The main, basic embodiment describes a method of selecting stocks at a selected period. (The example above uses yearly selection.) This is based on choosing the top ranked companies in each period. An alternative method is to select companies as "buys" if they rise in the rankings from one period to the next and to hold these companies until they become "sells" by falling in future rankings.

ALTERNATIVE EMBODIMENT 5

The examples above used the basic Tech-Line® indicators for illustration. However, other patent indicators can be used to measure technological impact, and thus it is clear that these other indicators should also improve the patent selection scoring mechanism. Patent indicators that were not used in the examples above, but which could easily be added, include patent counts, other citation indicators such as citation frequency, citations per patent, citation percentile, internal or external citation frequency, number of foreign filings and grants, percentage of patents that are renewed, number or percentage of patents that are licensed, number of non-patent references, and others. The additional indicators can be normalized by industry in the same way that the indicators were normalized in the main embodiment above.

ALTERNATIVE EMBODIMENT 6

The main, basic embodiment ranked companies such that the top N companies would be likely to receive superior stock returns. In an analogous manner, the bottom N ranked companies may be expected to perform poorly. This information may be used in a strategy for "selling short" or for generating a list of companies that should be avoided.

ALTERNATIVE EMBODIMENT 7

In the examples discussed above, the weighting exponents $\beta_i$ of the scoring equation are equal to 1 (i.e., $\beta_i=1$ for i=0 to i=k−1). However, the scope of the invention includes weighting exponents other than 1.

Although the description above contains many specificities, these should not be construed as limiting the scope of the invention but as merely providing illustrations of some of the presently preferred embodiments of this invention. For example the underlying patent database need not be constrained to U.S. patents, the companies need not be constrained to U.S. exchanges, the time periods need not be 1 year, and the patent and financial indicators need not be restricted to those used above.

In the most generalized terms, the present invention provides a scheme for selecting a portfolio of company stocks for a client which is predicted to have future performance that achieves a predesired financial outcome. Examples of the predetermined financial outcome include a return over a predetermined period of time in excess of a predetermined percentage (e.g., a high return), a volatility below a predetermined value, change in market-to-book, or combinations of these outcomes or other investment strategy goals. Furthermore, the predesired financial outcome may be optimized for purchasing the stocks of a specified number of companies (e.g., a portfolio of 10 companies, 20 companies, etc . . . ) or for holding stocks for a specified period of time (e.g., one year).

Once the scores are ranked from highest to lowest, the rankings are used to generate recommendations regarding which company stock to purchase for the portfolio. Changes in scores over a selected time period may also be used to select stocks to buy and sell. The recommendations are displayed on a summary report for review by the client or the client's financial manager, or are used directly in an automated manner to buy amounts of company stock for the portfolio, or to sell amounts of company stock from the portfolio in accordance with the recommendation. The buy/sell recommendations may be electronically communicated to the trade execution computer (not shown) which automatically performs the necessary transactions to execute the buy/sell recommendations. The trade execution computer may be any suitable computer for executing trade orders. One example of such a computer is described in U.S. Pat. No. 5,819,238 (Fernholz), the entire disclosure of which is incorporated by reference herein.

The portfolio selection scheme of the present invention provides superior results to market indexes and is easily implemented using a general purpose computer by someone with average programming skills.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims. Thus the scope of the invention should be determined by the appended claims and their legal equivalents, rather than by the examples given.

What is claimed is:

1. A computer-implemented method of selecting a portfolio of company stocks for a client which is predicted to have future performance that achieves a predesired financial outcome, the method comprising:

(a) calculating a score for a plurality of companies whose stock may be potentially selected to be in the portfolio by using the equation:

$$\text{score} = \sum_{i=0}^{k-1} \alpha_i x_i^{\beta_i}$$

wherein $x_i$ are company indicators which include industry normalized patent indicators, $\alpha_i$ are weighting coefficients for the respective company indicators, at least one of the weighting coefficients being non-zero, the weighting coefficients being selected so that companies which receive a high score are predicted to contribute to achieving the predesired financial outcome, and $\beta_i$ are weighting exponents, and that companies which receive a low score are predicted to not contribute to achieving the predesired financial outcome, each company being assigned to a predefined industry;

(b) ranking the calculated scores from highest to lowest and generating recommendations of which company stock to purchase for the portfolio based upon the ranking; and (c) displaying the recommendations on a summary report for review by the client or the client's financial manager, or buying amounts of company stock for the portfolio in accordance with the recommendations, or selling amounts of company stock from the portfolio in accordance with the recommendations.

2. A method according to claim 1 wherein the weighting coefficients used in the equation of step (a) are determined by:

(i) choosing a set of companies and determining one or more indicators for the set of companies, including one or more industry normalized patent indicators;

(ii) choosing a set of weighting coefficients for the indicators and calculating a score for each company in the set of companies;

(iii) determining how well the scores for the set of companies achieve the predesired financial outcome in a predetermined historical time period;

(iv) repeating steps (ii) and (iii) for a plurality of different sets of weighting coefficients; and (v) selecting the set of weighting coefficients which selects the set of companies most closely achieving the predesired financial outcome in the predetermined historical time period, and using the selected set of weighting coefficients in the equation of step (a).

3. A method according to claim 2 wherein a Monte Carlo method is used to determine the weighting coefficients.

4. A method according to claim 2 wherein a fitting algorithm is used to determine the weighting coefficients.

5. A method according to claim 2 wherein an optimization method is used to determine the weighting coefficients.

6. A method according to claim 1 wherein the recommendations of which company stock to purchase for the portfolio is based upon the companies having the highest scores.

7. A method according to claim 1 wherein $\beta=1$ for i=0 to i=k−1.

8. A method according to claim 1 wherein the company indicators include only industry normalized patent indicators.

9. A method according to claim 1 wherein the industry normalized patent indicators are selected from the group comprising at least one of: (i) the number of utility patents granted to the company in a given time period, (ii) the percentage change in the number of patents issued to the company in a given time period, (iii) a current impact index which measures how frequently a company's patents are cited by later patents, (iv) a science linkage which measures the average number of citations that a company's patents make to scientific papers and similar research publications, and (v) a technology cycle time which is the median age in years of patents cited on the front pages of a company's patents.

10. A method according to claim 1 wherein the company indicators include at least one financial indicator.

11. A method according to claim 1 wherein one or more of the industry normalized patent indicators are patent citation indicators.

12. A method according to claim 1 wherein the predesired financial outcome is a return over a predetermined period of time in excess of a predetermined percentage.

13. A method according to claim 1 wherein the predesired financial outcome is optimized for holding stocks for a specified period of time.

14. A method according to claim 1 wherein the predesired financial outcome is a volatility below a predetermined value.

15. A method according to claim 1 wherein the predesired financial outcome is a combination of investment strategy goals.

16. A method according to claim 1 wherein the predesired financial outcome is optimized for purchasing the stocks of a specified number of companies.

17. A method according to claim 1 wherein the predesired financial outcome is change in market-to-book.

18. A computer-implemented system for selecting a portfolio of company stocks for a client which is predicted to have future performance that achieves a predesired financial outcome, the system comprising:

(a) means for calculating a score for a plurality of companies whose stock may be potentially selected to be in the portfolio by using the equation:

$$\text{score} = \sum_{i=0}^{k-1} \alpha_i x_i^{\beta i}$$

wherein $x_i$ are company indicators which include industry normalized patent indicators, $\alpha_i$ are weighting coefficients for the respective company indicators, at least one of the weighting coefficients being non-zero, the weighting coefficients being selected so that companies which receive a high score are predicted to contribute to achieving the predesired financial outcome, and $\beta_i$ are weighting exponents, and that companies which receive a low score are predicted to not contribute to achieving the predesired financial outcome, each company being assigned to a predefined industry;

(b) means for ranking the calculated scores from highest to lowest and generating recommendations of which company stock to purchase for the portfolio based upon the ranking; and (c) means for displaying the recommendations on a summary report for review by the client or the client's financial manager, or means for buying amounts of company stock for the portfolio in accordance with the recommendations, or means for selling amounts of company stock from the portfolio in accordance with the recommendations.

19. A system according to claim 18 further comprising weighting coefficient determining apparatus comprising:

(i) means for choosing a set of companies and determining one or more indicators for the set of companies, including one or more industry normalized patent indicators;

(ii) means for choosing a set of weight coefficients for the indicators and calculating a score for each company in the set of companies; and (iii) means for determining how well the scores for the set of companies achieve the predesired financial outcome in a predetermined historical time period;

wherein the process performed by elements (ii) and (iii) are repeated for a plurality of different sets of weighting coefficients, the weighting coefficient determining apparatus further comprising:

(iv) means for selecting the set of weighting coefficients which selects the set of companies most closely achieving the predesired financial outcome in the predetermined historical time period, and using the selected set of weighting coefficients in the score equation.

20. A system according to claim 19 wherein a Monte Carlo method is used to determine the weighting coefficients.

21. A system according to claim 19 wherein a fitting algorithm is used to determine the weighting coefficients.

22. A system according to claim 19 wherein an optimization method is used to determine the weighting coefficients.

23. A system according to claim 18 wherein the recommendations of which company stock to purchase for the portfolio is based upon the companies having the highest scores.

24. A system according to claim 18 wherein $\beta=1$ for $i=0$ to $i=k-1$.

25. A system according to claim 18 wherein the company indicators include only industry normalized patent indicators.

26. A system according to claim 18 wherein the industry normalized patent indicators are selected from the group comprising at least one of: (i) the number of utility patients granted to the company in a given time period, (ii) the percentage change in the number of patents issued to the company in a given time period, (iii) a current impact index which measures how frequently a company's patents are cited by later patents, (iv) a science linkage which measures the avenge number of citations that a company's patents make to scientific papers and similar research publications, and (v) a technology cycle time which is the median age in year of patents cited on the front pages of a company's patents.

27. A system according to claim 18 wherein the company indicators include at least one financial indicator.

28. A system according to claim 18 wherein one or more of the industry normalized patent indicators are patent citation indicators.

29. A system according to claim 18 wherein the predesired financial outcome is a return over a predetermined period of time in excess of a predetermined percentage.

30. A system according to claim 18 wherein the predesired financial outcome is optimized for holding stocks for a specified period of time.

31. A system according to claim 18 wherein the predesired financial outcome is a volatility below a predetermined value.

32. A system according to claim 18 wherein the predesired financial outcome is a combination of investment strategy goals.

33. A system according to claim 18 wherein the predesired financial outcome is optimized for purchasing the stocks of a specified number of companies.

34. A system according to claim 18 wherein the predesired financial outcome is change in market-to-book.

35. An article of manufacture comprising a computer usable medium having computer readable code means therein for selecting a portfolio of company stocks for a client which is predicted to have future performance that achieves a predesired financial outcome, the computer readable program code means in the article of manufacture comprising:

(a) computer readable program code means for calculating a score for a plurality of companies whose stock may be potentially selected to be in the portfolio by using the equation:

$$\text{score} = \sum_{i=0}^{k-1} \alpha_i x_i^{\beta_i}$$

wherein $x_i$ are company indicators which include industry normalized patent indicators, $\alpha_i$ are weighting coefficients for the respective company indicators, at least one of the weighting coefficients being non-zero, the weighting coefficients being selected so that companies which receive a high score are predicted to contribute to achieving the predesired financial outcome, and $\beta_i$ are weighting exponents, and that companies which receive a low score are predicted to not contribute to achieving the predesired financial outcome, each company being assigned to a predefined industry;

(b) computer readable program code means for ranking the calculated scores from highest to lowest and generating recommendations of which company stock to purchase for the portfolio based upon the ranking; and (c) computer readable program code means for displaying the recommendations on a summary report for review by the client or the client's financial manager, or a computer readable program code means for buying amounts of company stock for the portfolio in accordance with the recommendations, or computer readable program code means for selling amounts of company stock from the portfolio in accordance with the recommendations.

36. An article of manufacture according to claim 35 further comprising weighting coefficient determining apparatus comprising:

(i) computer readable program code means for choosing a set of companies and determining one or more indicators for the set of companies, including one or more industry normalized patent indicators;

(ii) computer readable program code means for choosing a set of weighting coefficients for the indicators and calculating a score for each company in the set of companies; and (iii) computer readable program code means for determining how well the scores for the set of companies achieve the predesired facial outcome in a predetermined historical time period;

wherein the process performed by elements (ii) and (iii) are repeated for a plurality of different sets of weighting coefficients, the weighting coefficient determining apparatus further comprising:

(iv) computer readable program code means for selecting the set of weighting coefficients which selects the set of companies most closely achieving the predesired financial outcome in the predetermined historical time period, and using the selected set of weighting coefficients in the score equation.

37. An article of manufacture according to claim 36 wherein a Monte Carlo method is used to determine the weighting coefficients.

38. An article of manufacture according to claim 36 wherein a fitting algorithm is used to determine the weighting coefficients.

39. An article of manufacture according to claim 36 wherein an optimization method is used to determine the weighting coefficients.

40. An article of manufacture according to claim 35 wherein the recommendations of which company stock to purchase for the portfolio is based upon the companies having the highest scores.

41. An article of manufacture according to claim 35 wherein $\beta=1$ for $i=0$ to $i=k-1$.

42. An article of manufacture according to claim 35 wherein the company indicators include only industry normalized patent indicators.

43. An article of manufacture according to claim 35 wherein the industry normalized patent indicators are selected from the group comprising at least one of: (i) the number of utility patents granted to the company in a given time period, (ii) the percentage change in the number of patents issued to the company in a given time period, (iii) a current impact index which measures how frequently a company's patents are cited by later patents, (iv) a science linkage which measures the average number of citations that a company's patents make to scientific papers and similar research publications, and (v) a technology cycle time which is the median age in years of patents cited on the front pages of a company's patents.

44. An article of manufacture according to claim 35 wherein the company indicators include at least one financial indicator.

45. An article of manufacture according to claim 35 wherein one or more of the industry normalized patent indicators are patent citation indicators.

46. An article of manufacture according to claim 35 wherein the predesired financial outcome is a return over a predetermined period of time in excess of a predetermined percentage.

47. An article of manufacture according to claim 35 wherein the predesired financial outcome is optimized for holding stocks for a specified period of time.

48. An article of manufacture according to claim 35 wherein the predesired financial outcome is a volatility below a predetermined value.

49. An article of manufacture according to claim 35 wherein the predesired financial outcome is a combination of investment strategy goals.

50. An article of manufacture according to claim 35 wherein the predesired financial outcome is optimized for purchasing the stocks of a specified number of companies.

51. An article of manufacture according to claim 35 wherein the predesired financial outcome is change in market-to-book.

52. A computer-implemented method of selecting a portfolio of company stocks for a client which is predicted to have future performance that achieves a predesired financial outcome, the method comprising:

(a) at a first point in time, calculating a score for a plurality of companies whose stock may be potentially selected to be in the portfolio by using the equation:

$$\text{score} = \sum_{i=0}^{k-1} \alpha_i x_i^{\beta i}$$

wherein $x_i$ are company indicators including industry normalized patent indicators, $\alpha_i$ are weighting coefficients for the respective company indicators, at least one of the weighting coefficients being non-zero, the weighting coefficients being selected so that companies which receive a high score are predicted to contribute to achieving the predesired financial outcome, and $\beta_i$ are weighting exponents, and that companies which receive a low score are predicted to not contribute to achieving the predesired financial outcome, each company being assigned to a predefined industry;

(b) ranking the calculated scores from highest to lowest;

(c) repeating steps (a) and (b) at a second point in time;

(d) comparing the change in scores for each of the companies between the first and second points in time, and generating recommendations of which company stock to purchase for the portfolio or to sell from the portfolio based upon the changes in scores between the first and second points in time; and (e) displaying the recommendations on a summary report for review by the client or the client's financial manager, or purchasing company stock for the portfolio based upon the changes in scores, or selling company stock in the portfolio based upon the changes in scores.

53. A method according to claim 52 wherein step (d) comprises generating recommendations of which company stock to purchase for the portfolio based upon the companies having the greatest improvement in scores between the first and second points in time.

54. A method according to claim 52 wherein step (d) comprises generating recommendations of which company stock to purchase for the portfolio based upon the companies showing an improvement in scores between the first and second points in time of at least a fixed amount.

55. A method according to claim 52 wherein step (d) comprises generating recommendations of which company stock to sell if the company stock is in the portfolio based upon the companies which do not show an improvement in scores between the first and second points in time of at least the fixed amount.

56. A system for selecting a portfolio of company stocks for a client which is predicted to have future performance that achieves a predesired financial outcome, the system comprising:

(a) means for calculating a score for a plurality of companies whose stock may be potentially selected to be in the portfolio by using the equation:

$$\text{score} = \sum_{i=0}^{k-1} \alpha_i x_i^{\beta i}$$

wherein $x_i$ are company indicators including industry normalized patent indicators, $\alpha_i$ are weighting coefficients for the respective company indicators, at least one of the weighting coefficients being non-zero, the weighting coefficients being selected so that companies which receive a high score are predicted to contribute to achieving the predesired financial outcome, and $\beta_i$ are weighting exponents, and that companies which receive a low score are predicted to not contribute to achieving the predesired financial outcome, each company being assigned to a predefined industry;

(b) means for ranking the calculated scores from highest to lowest, wherein the means for calculating and means for ranking perform their respective functions at a first and a second point in time;

(c) means for comparing the change in scores for each of the companies between the first and second points in time;

(d) means for generating recommendations of which company stock to purchase for the portfolio or to sell from the portfolio based upon the changes in scores between the first and second points in time; and (e) means for displaying the recommendations on a summary report for review by the client or the client's financial manager, or means for purchasing company stock for the portfolio based upon the changes in scores, or means for selling company stock in the portfolio based upon the changes in scores.

57. A system according to claim 56 wherein the means for generating recommendations of which company stock to purchase for the portfolio generates the recommendations based upon the companies having the greatest improvement in scores between the first and second points in time.

58. A system according to claim 56 wherein the means for generating recommendations of which company stock to purchase for the portfolio generates the recommendations based upon the companies showing an improvement in scores between the first and second points in time of at least a fixed amount.

59. A system according to claim 56 wherein the means for generating recommendations of which company stock to sell if the company stock is in the portfolio generates the recommendations based upon the companies which do not show an improvement in scores between the first and second points in time of at least the fixed amount.

60. An article of manufacture comprising a computer usable medium having computer readable code means therein for selecting a portfolio of company stocks for a client which is predicted to have future performance that achieves a predesired financial outcome, the computer readable program code means in the article of manufacture comprising:

(a) computer readable program code means for calculating a score for a plurality of companies whose stock may be potentially selected to be in the portfolio by using the equation:

$$\text{score} = \sum_{i=0}^{k-1} \alpha_i x_i^{\beta i}$$

wherein $x_i$ are company indicators including industry normalized patent indicators, $\alpha_i$ are weighting coefficients for the respective company indicators, at least one of the weighting coefficients being non-zero, the weighting coefficients being selected so that companies which receive a high score are predicted to contribute to achieving the predesired financial outcome, and $\beta_i$ are weighting exponents, and that companies which receive a low score are predicted to not contribute to achieving the predesired financial outcome, each company being assigned to a predefined industry;

(b) computer readable program code means for ranking the calculated scores from highest to lowest, wherein the means for calculating and means for ranking perform their respective functions at a fist and a second point in time;

(c) computer readable program code means for comparing the change in scores for each of the companies between the first and second points in time;

(d) computer readable program code means for generating recommendations of which company stock to purchase for the portfolio or to sell from the portfolio based upon the changes in scores between the first and second points in time; and (e) computer readable program code means for displaying the recommendations on a summary report for review by the client or the client's financial manager, or computer readable program code means for purchasing company stock for the portfolio based upon the changes in scores, or computer readable program code means for selling company stock in the portfolio based upon the changes in scores.

61. An article of manufacture according to claim 60 wherein the computer readable program code means for generating recommendations of which company stock to purchase for the portfolio generates the recommendations based upon the companies having the greatest improvement in scores between the first and second points in time.

62. An article of manufacture according to claim 60 wherein the computer readable program code means for generating recommendations of which company stock to purchase for the portfolio generates the recommendations based upon the companies showing an improvement in scores between the first and second points in time of at least a fixed amount.

63. An article of manufacture according to claim 60 wherein the computer readable program code means for generating recommendations of which company stock to sell if the company stock is in the portfolio generates the recommendations based upon the companies which do not show an improvement in scores between the first and second points in time of at least the fixed amount.

* * * * *